United States Patent
Maor et al.

(10) Patent No.: US 12,373,305 B1
(45) Date of Patent: Jul. 29, 2025

(54) SEPARATED DATABASE MANAGEMENT

(71) Applicant: Pliops Ltd., Tel Aviv (IL)

(72) Inventors: Roey Maor, Tel Aviv (IL); Edward Bortnikov, Tel Aviv (IL); Eshcar Hillel, Tel-Aviv (IL); Moshe Twitto, Givat Shemuel (IL)

(73) Assignee: Pliops Ltd., Tel Aviv (IL)

( * ) Notice: Subject to any disclaimer, the term of this patent is extended or adjusted under 35 U.S.C. 154(b) by 0 days.

(21) Appl. No.: 18/600,706

(22) Filed: Mar. 9, 2024

(51) Int. Cl.
*G06F 11/14* (2006.01)
*G06F 16/22* (2019.01)

(52) U.S. Cl.
CPC ...... *G06F 11/1458* (2013.01); *G06F 16/2246* (2019.01); *G06F 2201/80* (2013.01)

(58) Field of Classification Search
CPC ............. G06F 11/1458; G06F 16/2246; G06F 2201/80
See application file for complete search history.

(56) References Cited

U.S. PATENT DOCUMENTS

| | | | | |
|---|---|---|---|---|
| 9,971,526 | B1 * | 5/2018 | Wei | G06F 3/064 |
| 2013/0282999 | A1 * | 10/2013 | Bennett | G06F 11/2074 |
| | | | | 711/162 |
| 2019/0034427 | A1 * | 1/2019 | Trika | G06F 16/21 |
| 2022/0335027 | A1 * | 10/2022 | Subramanian Seshadri | G06F 16/24573 |
| 2024/0126738 | A1 * | 4/2024 | Bhola | G06F 16/2282 |

OTHER PUBLICATIONS

Jie Guo et al, "A Design to Reduce Write Amplification in Object-based NAND Flash Devices", ACM, pp. 1-10 (Year: 2016)*

* cited by examiner

*Primary Examiner* — Jared M Bibbee
(74) *Attorney, Agent, or Firm* — Reches Patents (57) ABSTRACT

A method for updating a key-value (KV) storage system, the method includes (a) receiving a request to write a KV pair to the KV storage system; (b) storing the KV pair in an input buffer that is maintained in a volatile memory module of the KV storage system; (c) storing the KV pair in a separated KV database that is maintained in a non-volatile memory module of the KV storage system; (d) updating a B-tree that is stored in the non-volatile memory unit with (i) a key of the KV pair, (ii) a KV pair timestamp, and (iii) retrieval information for retrieving the KV pair from the separated KV database; and (e) maintaining a backup B-tree in the non-volatile memory module of the KV storage system, wherein the B-tree and the backup B-tree are separated from the separated KV database.

20 Claims, 4 Drawing Sheets

SEPARATED DATABASE MANAGEMENT

BACKGROUND

Key-value (KV) pairs are stored in various KV storage systems.

The management of KV storage systems is complex.

There is a growing need to provide a solution that improve the management and/or usage of a KV storage system.

BRIEF DESCRIPTION OF THE DRAWINGS

The subject matter that is regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

There is provided a solution that reduces the write amplification by using a B-tree that does not store values and a separated KV data structures that stored the values. The B-tree is stored in a volatile memory module and a backup B-tree is stored in a non-volatile memory—and is managed on a page to page (or unit to unit) basis. The page is small and updates involve opening a new page. The compact size of the pages contributes to an improved memory usage and reduces the cost associated with opening a new page. The separation between the separated KV data structure and the B-tree increases the efficiency of the management of the storage system.

Various data structures stored int eh volatile and non-volatile memory modules enable fast and accurate recovery from volatile memory module failures.

Status and history data structures are compact and allow to efficiently delete older values of KV pairs in a safe manner-when they are not needed.

Figure 1:
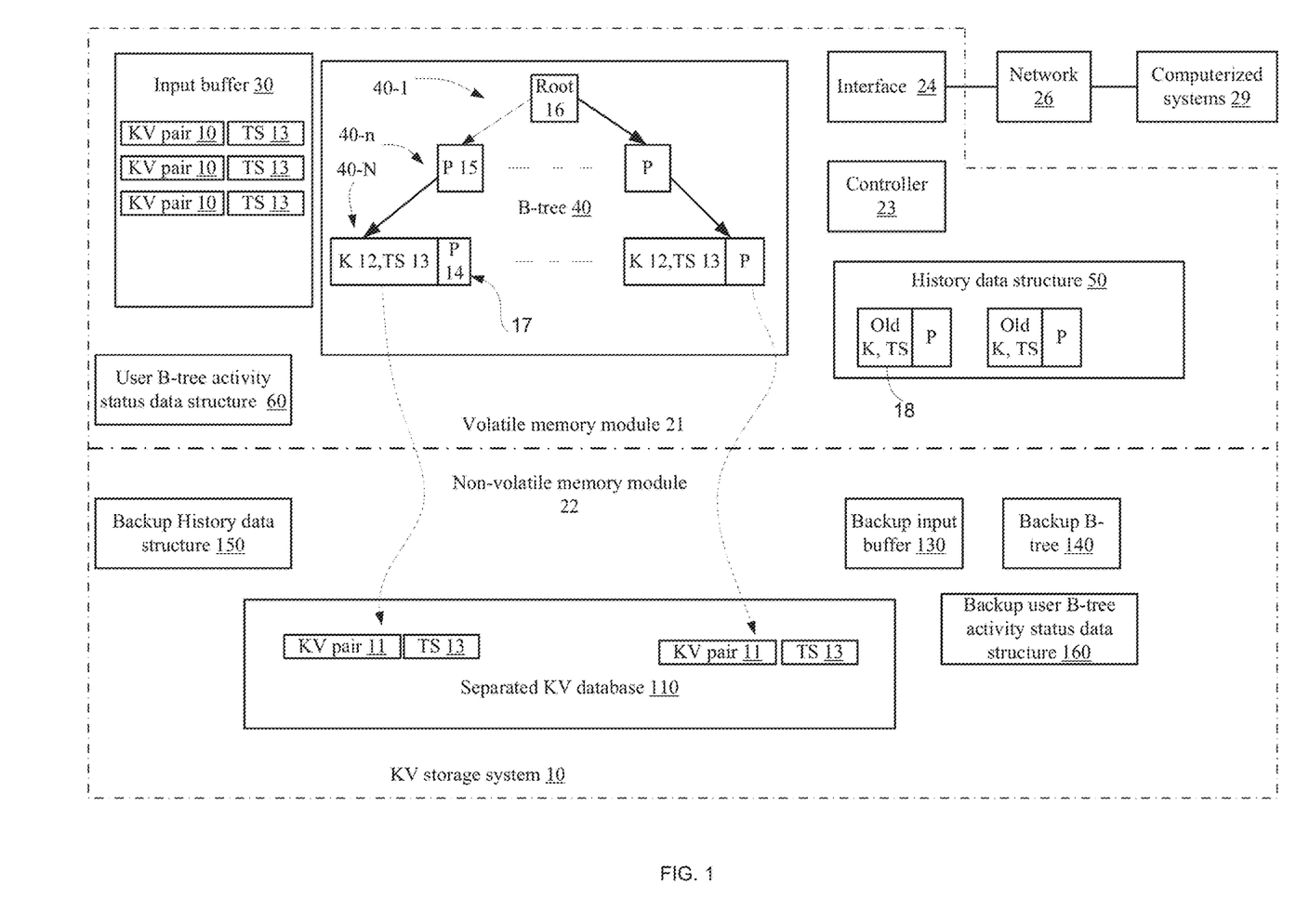
FIG. 1 illustrate an example of a KV storage system.

FIG. 1 illustrates an example of KV storage system 10 that includes interface 23, controller 23, volatile memory module 21, non-volatile memory module 22, and various data structures.

FIG. 1 illustrates the volatile memory module 21 as storing the following data structures: input buffer 30, B-tree 40, history data structure 50, and user B-tree activity status data structure 60.

According to an embodiment, the input buffer 30 is configured to store KV pairs 10 and their associated timestamps (TS 13) in the volatile memory module 21 until the corresponding keys, values and the timestamps are stored in the non-volatile memory module.

According to an embodiment, the history data structure 50 is configured to store, for old KV pairs, the corresponding keys, corresponding timestamps and corresponding retrieval information (such as a pointer P) for retrieving the old KV pairs from the separated KV database 110.

According to an embodiment, the B-tree 40 is used for accessing KV pairs stored in the separated KV database 110. The B-tree 40 has a first plurality (N) of layers 40-1 till 40-N, whereas the first layer includes a root and the second till (N-1)th layer store inner B-tree pointes that eventually lead to the leaf nodes of the B-tree—that store for each KV pair-a key (K 12), an associated time stamp (TS 13), and retrieval information (such as a pointer P 14) for retrieving the KV pairs from the separated KV database 110.

According to an embodiment, the user B-tree activity status data structure 60 stores information related to the activity of users that access the B-tree-such as access requests, periods in which a user was active, periods in which a user was inactive, and the like.

FIG. 1 illustrates the non-volatile memory module 22 as storing the following data structures: backup input buffer 130, backup B-tree 140, backup history data structure 150, backup user B-tree activity status data structure 160 and separated KV database 110.

According to an embodiment, any of the backup data structures may be updated periodically and/or in response to an event such as an occurrence of a defined number of updates and/or a number of access requests, and the like.

According to an embodiment, the storage system may store one or more data structures other than those illustrated in FIG. 1 and/or may store less data structures than those illustrated in FIG. 1.

The non-volatile memory module 22 may include one or more non-volatile memory units such as but not limited to one or more solid state drive (SSD) units and/or one or more memristor based memory modules, and the like.

The volatile memory module 21 may include one or more volatile memory units such as but not limited to one or more dynamic random access memory (DRAM) units, and the like.

According to an embodiment, interface 24 is in communication with a network 26 that in turn is in communication with computerized systems 26 capable of sending access requests to the KV storage system.

According to an embodiment, the interface 24 is configured to receive a request to write a KV pair to the KV storage system.

According to an embodiment, controller 23 is configured to control at least some of the operations executed in relation to KV pairs. For example, controller 23 is configured to:
  a. Control a storing of the KV pair in an input buffer that is maintained in a volatile memory module of the KV storage system.
  b. Control a storing of the KV pair in a separated KV database that is maintained in a non-volatile memory module of the KV storage system.
  c. Update a B-tree that is stored in the volatile memory unit with (i) a key of the KV pair, (ii) a KV pair timestamp, and (iii) retrieval information for retrieving the KV pair from the separated KV database.
  d. Control a maintaining of a backup B-tree in the non-volatile memory module of the KV storage system, wherein the B-tree and the backup B-tree are separated from the separated KV database.

According to an embodiment, the B-tree and the backup B-tree do not store a value of the KV pair.

According to an embodiment, controller 23 is configured to maintain, in the volatile memory module, a user B-tree activity status data structure.

According to an embodiment, controller 23 is configured to maintain, in the volatile memory module, a history data structure that comprises retrieval information for retrieving old and relevant KV pairs from the separated KV database, wherein an old and relevant KV pair is associated with at least one active user and is of a value that differs from a last updated value of the KV pair within the KV storage system.

According to an embodiment, controller 23 is configured to determine that an old and relevant KV pair has become an old and irrelevant KV pair, based on the user B-tree activity status information.

According to an embodiment, controller 23 is configured to control a deletion of the old and irrelevant KV pair from the separated KV database and control a deletion of corresponding retrieval information from the history data structure.

According to an embodiment, controller 23 is configured to maintain a backup input buffer in the non-volatile memory module.

According to an embodiment, controller 23 is configured to maintain a backup user B-tree activity status data structure in the non-volatile memory module.

According to an embodiment, the backup B-tree includes backup B-tree pages of a size that does not exceed 4kBytes.

According to an embodiment, the backup B-tree includes backup B-tree pages, wherein a change in a content associated with a content of a current backup B-tree pages triggers a writing of a new B-tree page within an updated content. Using new pages is not costly due to the compact size of the B-tree page. The triggering of the writing of the new backup B-tree page provides a resilient storage scheme in which following an occurrence of a failure during an update of a backup B-tree page—the older version of the backup B-tree page can be sued for recovery.

Figure 2:
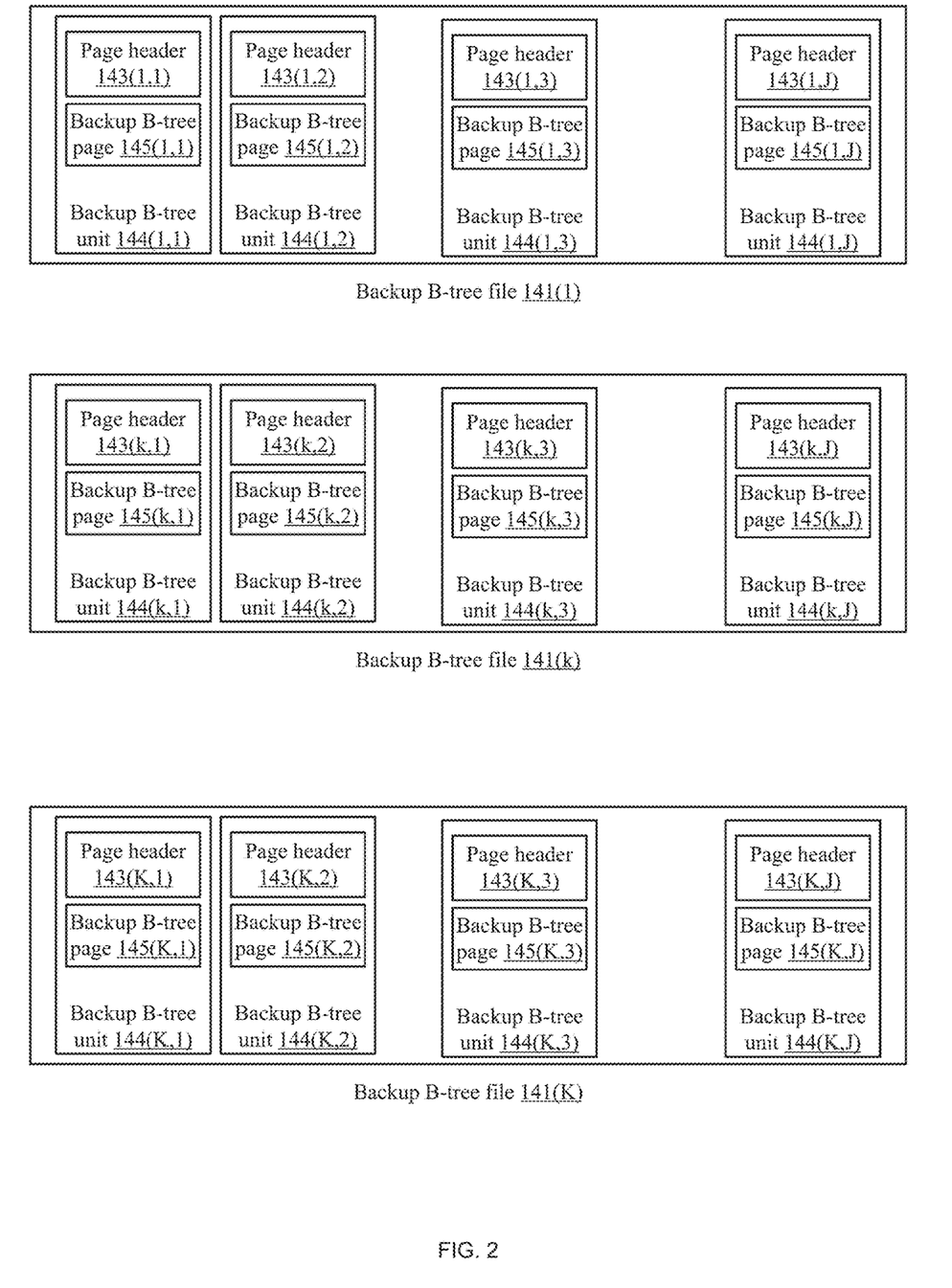
FIG. 2 illustrates an examples of a backup B-tree file.

FIG. 2 illustrates an example of a backup B-tree that includes a second plurality (K) of backup B-tree files 141(1)-141(K), whereas k is an index that ranges between 1 and K—but for simplicity of explanation is illustrated in addition to backup B-tree file 141(1) and backup B-tree file 141(K).

Each backup B-tree file includes units (such as 144 (1,1)-144(K) and 144 (k)) that are relatively small (for example up to 4 Kbytes), and include a page header (such as 143 (1,1)-143(K) and 143 (k)), and a B-tree page (such as 145 (1,1)-145(K) and 145 (k)). A unit may also include a unit header.

The small size of the units reduces the cost associated with opening a new unit, re-using memory space associated with an irrelevant unit, and increases the utilization of the non-volatile space allocated to the storage of the backup B-tree file—as the units are not necessarily aligned and/or there may be gaps between one unit to another.

According to an embodiment, new versions of units are created whenever an update to any object in that unit (B-tree page within the unit) is made.

According to an embodiment, pages are not written in place.

According to an embodiment units are immutable. If a page has to be rewritten then they are written to a new location in the Backup B-tree file. This is both in order to serve readers of old versions of the pages, and to back them up in case of a sudden power loss.

According to an embodiment units that are not needed anymore are marked as free space, to be claimed by later on.

According to an embodiment, units are not modified in place because of crash recovery. The system could crash at any point during block overwrite.

According to an embodiment, the non-volatile module is updated in batches—and not per each single KV pair update-which increases the efficiency of writing to the non-volatile module.

Figure 3:
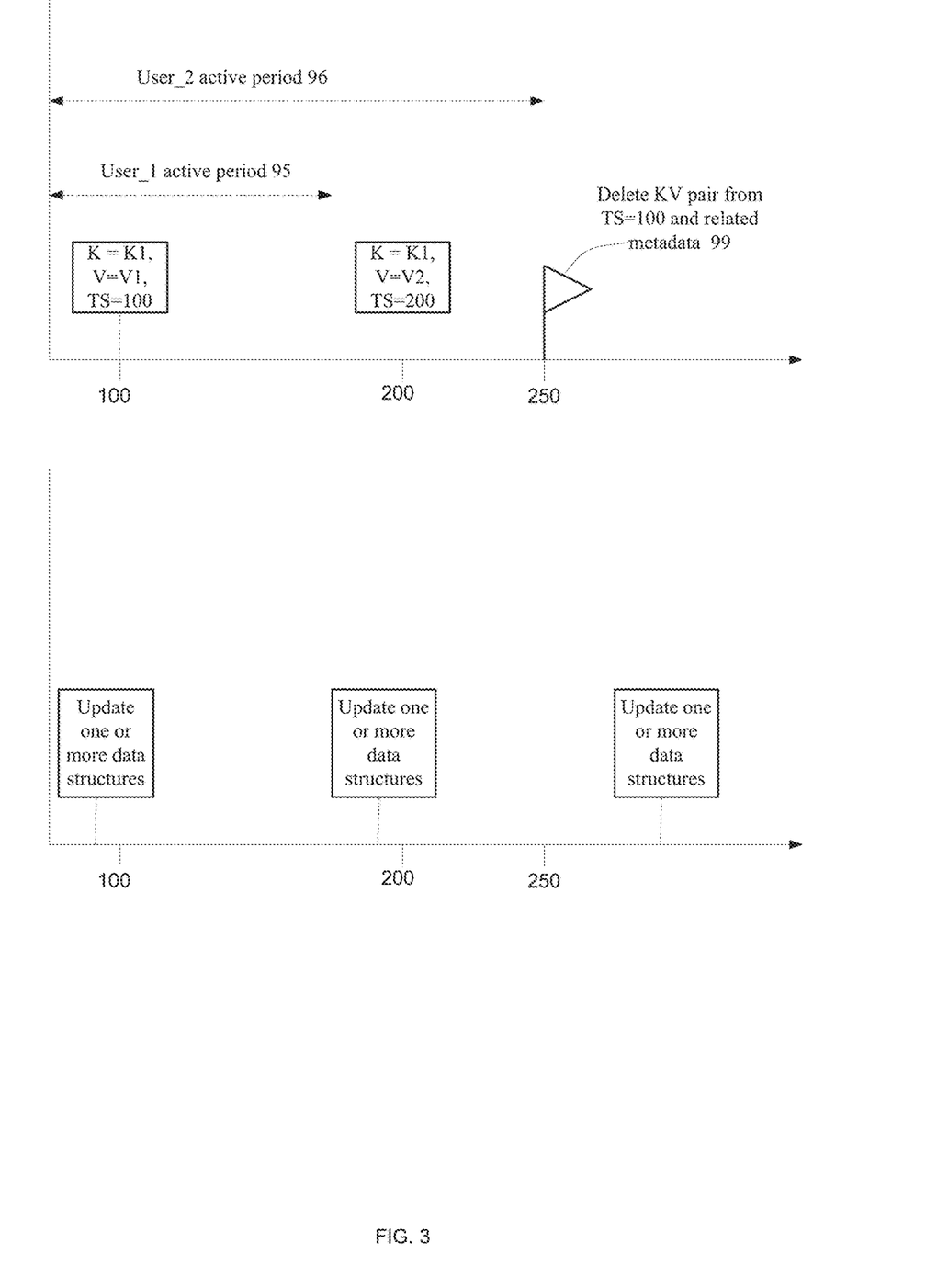
FIG. 3 illustrates an example of timing diagrams.

FIG. 3 illustrates an example of having a first user active till a point of time that corresponds to timestamp 166 (see user_1 active period 95), a second user active till a point of time that corresponds to timestamp 250 (see user_2 active period 92), a first KV pair (having a key that equals K1, a value of V1 and a timestamp of 100), as second KV pair (having a key that equals K1, a value of V2 and a timestamp of 200) that should replace the first KV pair.

At the time of reception of the first KV pair the first users and the second users were active in relation to the B-tree (active-even if they were related to KV pairs other than the first and second KV pairs)—and this the replacement of the first KV pair and deletion of related metadata has to wait till both first user and second user are inactive—as indicated by flag 99.

FIG. 3 also illustrates updates to one or more databases stored in the KV storage system.

Figure 4:
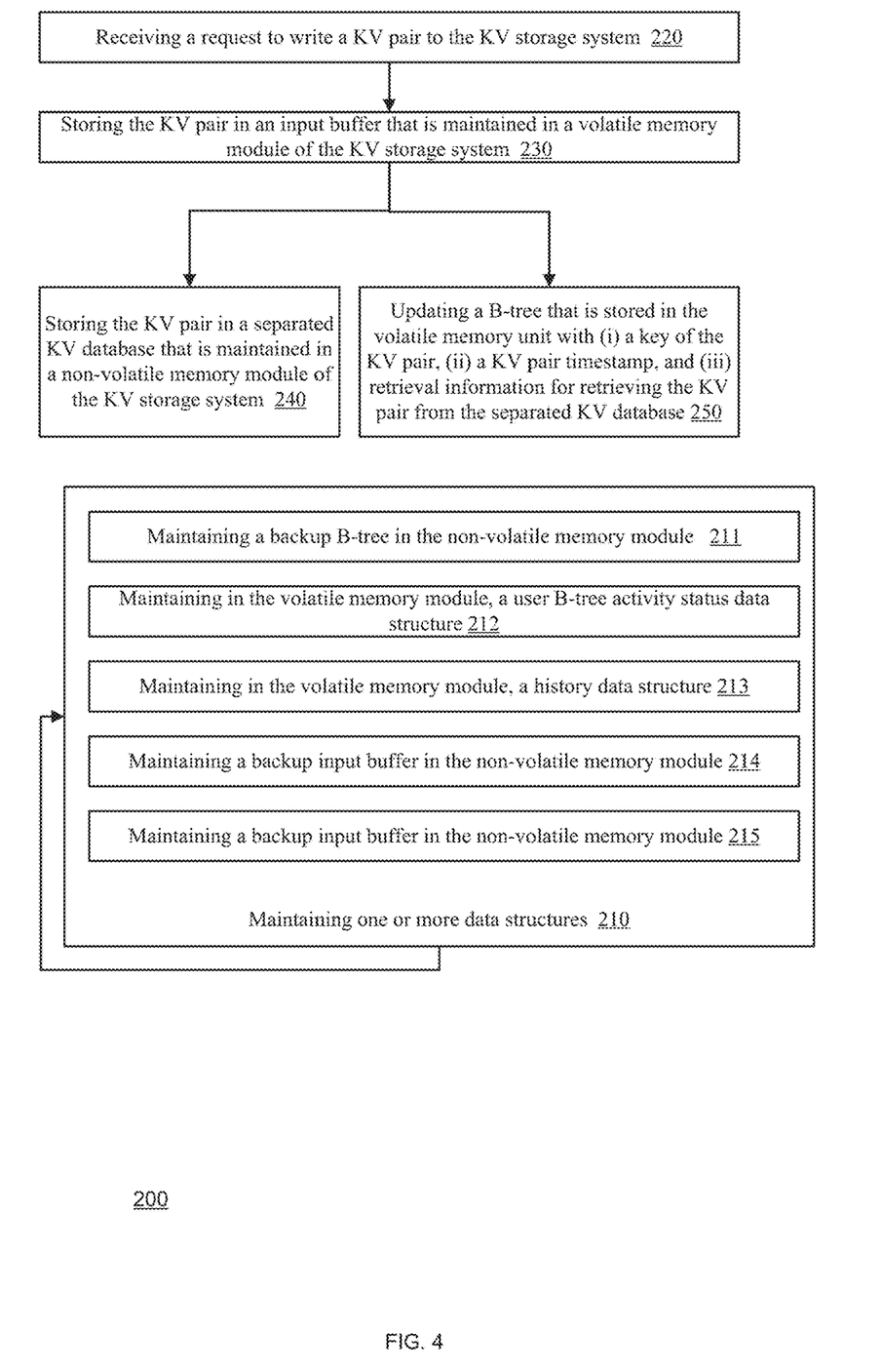
FIG. 4 illustrates an example of a method.

FIG. 4 illustrates an example of method 200.

According to an embodiment, method 200 includes steps 210, 220, 230, 240 and 250.

According to an embodiment, step 210 of maintaining one or more data structures is executed in parallel to other steps of method 200.

According to an embodiment, step 210 includes at least one of the following steps:

a. Maintaining a backup B-tree in the non-volatile memory module S211.

b. Maintaining in the volatile memory module, a user B-tree activity status data structure S212.

c. Maintaining in the volatile memory module, a history data structure S213.

d. Maintaining a backup input buffer in the non-volatile memory module S214.

e. Maintaining a backup input buffer in the non-volatile memory module S215.

f. Maintaining any other data structure-such as the B-tree, the separated KV data structure.

According to an embodiment, a maintaining of a data structure includes storing the data structure, updating the data structures, and the like. The maintaining of the B-tree and/or the separated KV data structure may be executed, at least in part, by other steps of method 200.

According to an embodiment, method 200 includes step 220 of receiving a request to write a KV pair to the KV storage system.

According to an embodiment, step 220 is followed by step 230 of storing the KV pair in an input buffer that is maintained in a volatile memory module of the KV storage system.

According to an embodiment, step 230 is followed by step 240 of storing the KV pair in a separated KV database that is maintained in a non-volatile memory module of the KV storage system.

According to an embodiment, step 240 is followed by step 250 of updating a B-tree that is stored in the volatile memory unit with (i) a key of the KV pair, (ii) a KV pair timestamp, and (iii) retrieval information for retrieving the KV pair from the separated KV database.

The following example illustrates the benefit in random read amplification reduction:

a. Cache size-C, data size-D, element size on disk-E, element size in cache-J, page size-P b. Each leaf is a group of elements. When one of them is in the cache-all of them are in the cache.

c. Number of elements in the cache:

$$\frac{c}{J} = >$$

number of leaves in the cache $$\frac{\frac{C}{J}}{\frac{P}{J}} = \frac{C}{P}$$

d. Number of leave groups in the data:

$$\frac{D \cdot J}{E \cdot P}.$$

e. For analysis purposes we assume size of directory in the cache is negligible (as the branching factor is in the 100's)
f. Probability that the required leaf is not in memory ($P_{L0}$):
g.

$$\frac{\left(\frac{D \cdot J}{E \cdot P}1\right) \text{ choose } \frac{C}{P}}{\left(\frac{D \cdot J}{E \cdot P}\right) \text{ choose } \frac{C}{P}}; \left(\frac{X-1 \text{ choose } Y}{X \text{ choose } Y}\right) = \frac{X-Y}{X} = > P_{L0} = \frac{DJ - EC}{DJ}.$$

h. A negative result in the above formula indicates all data resides in the cache, and therefore $P_{L0}=0$
i. Note that without kv-separation J=K+V, and with kv-separation: J=K
j. Number of KBs read without separation: $P*P_{L0}$
k. And number of Ios: $P_{L0}$
l. Number of KBs read with separation: $P*P_{L0}+V+4$
m. And number of Ios: $1+P_{L0}$
n. Example with D-4 TB, C-250 GB, K=16B, V=2K
o. Number of KBs read without kv-separation: 32*0.9375=30
p. And number of Ios: 0.9375
q. Number of KBs read with kv-separation: 4*0+2+4=6
r. And number of Ios: 1
s. Example with D-10 TB, C-100 GB, K=16B, V=1K
t. Number of KBs read without separation: 32*0.99=31.68
u. And number of Ios: 0.99
v. Number of KBs read with separation: 4*0.365+1+4=6.46
w. And number of Ios: 1.365

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for updating a key-value (KV) storage system, the method comprises:
   receiving a request to write a KV pair to the KV storage system;
   storing the KV pair in an input buffer that is maintained in a volatile memory module of the KV storage system;
   storing the KV pair in a separated KV database that is maintained in a non-volatile memory module of the KV storage system;
   updating a B-tree that is stored in the volatile memory unit with (i) a key of the KV pair, (ii) a KV pair timestamp, and (iii) retrieval information for retrieving the KV pair from the separated KV database; and
   maintaining a backup B-tree in the non-volatile memory module of the KV storage system, wherein the B-tree and the backup B-tree are separated from the separated KV database.

2. The method according to claim 1, wherein the B-tree and the backup B-tree do not store a value of the KV pair.

3. The method according to claim 1, further comprising maintaining, in the volatile memory module, a user B-tree activity status data structure.

4. The method according to claim 3, further comprising maintaining, in the volatile memory module, a history data structure that comprises retrieval information for retrieving old and relevant KV pairs from the separated KV database, wherein an old and relevant KV pair is associated with at least one active user and is of a value that differs from a last updated value of the KV pair within the KV storage system.

5. The method according to claim 4, further comprising determining that an old and relevant KV pair has become an old and irrelevant KV pair, based on the user B-tree activity status information.

6. The method according to claim 5, further comprising deleting the old and irrelevant KV pair from the separated KV database and deleting corresponding retrieval information from the history data structure.

7. The method according to claim 1, further comprising maintaining a backup input buffer in the non-volatile memory module.

8. The method according to claim 1, further comprising maintaining a backup user B-tree activity status data structure in the non-volatile memory module.

9. The method according to claim 1, wherein the backup B-tree comprises backup B-tree pages of a size that does not exceed 4kBytes.

10. The method according to claim 1, wherein the backup B-tree comprises backup B-tree pages, wherein a change in a content associated with a content of a current backup B-tree pages triggers a writing of a new B-tree page within an updated content.

11. A non-transitory computer readable medium for updating a key-value (KV) storage system, the non-transitory computer readable medium stores instructions for:
   receiving a request to write a KV pair to the KV storage system;
   storing the KV pair in an input buffer that is maintained in a volatile memory module of the KV storage system;
   storing the KV pair in a separated KV database that is maintained in a non-volatile memory module of the KV storage system;
   updating a B-tree that is stored in the volatile memory unit with (i) a key of the KV pair, (ii) a KV pair timestamp, and (iii) retrieval information for retrieving the KV pair from the separated KV database; and
   maintaining a backup B-tree in the non-volatile memory module of the KV storage system, wherein the B-tree and the backup B-tree are separated from the separated KV database.

12. The non-transitory computer readable medium according to claim 11, wherein the B-tree and the backup B-tree do not store a value of the KV pair.

13. The non-transitory computer readable medium according to claim 11, further storing instructions for maintaining, in the volatile memory module, a user B-tree activity status data structure.

14. The non-transitory computer readable medium according to claim 13, further storing instructions for maintaining, in the volatile memory module, a history data structure that comprise retrieval information for retrieving old and relevant KV pairs from the separated KV database, wherein an old and relevant KV pair is associated with at least one active user and is of a value that differs from a last updated value of the KV pair within the KV storage system.

15. The non-transitory computer readable medium according to claim 14, further storing instructions for determining that an old and relevant KV pair has become an old and irrelevant KV pair, based on the user B-tree activity status information.

16. The non-transitory computer readable medium according to claim 15, further storing instructions for deleting the old and irrelevant KV pair from the separated KV database and deleting corresponding retrieval information from the history data structure.

17. The non-transitory computer readable medium according to claim 11, further storing instructions for maintaining a backup input buffer in the non-volatile memory module.

18. The non-transitory computer readable medium according to claim 11, further storing instructions for maintaining a backup user B-tree activity status data structure in the non-volatile memory module.

19. The non-transitory computer readable medium according to claim 11, wherein the backup B-tree comprises backup B-tree pages, wherein a change in a content associated with a content of a current backup B-tree pages triggers a writing of a new B-tree page within an updated content.

20. A key-value (KV) storage system, comprising:
   an interface that is configured to receive a request to write a KV pair to the KV storage system; and
   a controller that is configured to:
      control a storing of the KV pair in an input buffer that is maintained in a volatile memory module of the KV storage system;
      control a storing of the KV pair in a separated KV database that is maintained in a non-volatile memory module of the KV storage system;
      update a B-tree that is stored in the volatile memory unit with (i) a key of the KV pair, (ii) a KV pair timestamp, and (iii) retrieval information for retrieving the KV pair from the separated KV database; and control a maintaining of a backup B-tree in the non-volatile memory module of the KV storage system, wherein the B-tree and the backup B-tree are separated from the separated KV database.

* * * * *